United States Patent [19]

Ziv-El

[11] Patent Number: 5,263,869
[45] Date of Patent: Nov. 23, 1993

[54] INTERACTIVE GROUP COMMUNICATION SYSTEM

[75] Inventor: Jakob Ziv-El, Herzlia, Israel

[73] Assignee: Interactive Communication Systems, Inc., Milwaukee, Wis.

[21] Appl. No.: 694,650

[22] Filed: May 2, 1991

[30] Foreign Application Priority Data

Jul. 19, 1990 [ZA] South Africa ............... 90/5655
Jan. 10, 1991 [ZA] South Africa ............... 91/0191

[51] Int. Cl.$^5$ .............................................. G09B 7/00
[52] U.S. Cl. ................................. 434/336; 434/323; 434/350; 379/97; 379/102; 395/200; 395/927
[58] Field of Search .......... 434/307, 308, 322, 323, 434/335, 336, 350; 358/53, 54, 96; 395/200, 927, 11; 379/97, 102

[56] References Cited

U.S. PATENT DOCUMENTS

| | | | |
|---|---|---|---|
| 3,641,685 | 2/1972 | Zawels et al. ............... | 434/336 |
| 4,715,818 | 12/1987 | Shapiro et al. ............. | 434/350 X |
| 4,767,335 | 8/1988 | Curt ......................... | 434/350 X |
| 4,785,472 | 11/1988 | Shapiro ...................... | 434/307 X |
| 4,877,408 | 10/1989 | Hartsfield ................... | 434/350 |
| 4,963,097 | 10/1990 | Anju .......................... | 434/336 X |
| 5,011,414 | 4/1991 | Yoshizawa et al. ........... | 434/336 X |

FOREIGN PATENT DOCUMENTS 0200053 8/1990 Japan ......................... 434/350

OTHER PUBLICATIONS

S. L. Robinson and F. C. Roberts, "Technologies For Group-Based Instruction", Third International Conference and Exhibition on Children in the Information Age: Human Development and Emerging Technologies, Sofia, Bulgaria, Nov. 1988.
S. L. Robinson, "Adaptive Instruction in Mainstream Classes: A Computer-Based Alternative for Learning Disabled Children", 1987.
S. L. Robinson, "Technology Assisted Group Instruction: Applications For the Handicapped", 1985 Computer Technology for the Handicapped Conference, Nov. 2, 1985.
S. L. Robinson and C. DePascale, "Effects of a Technology-Based Communication System On Student Responding and Teacher Questioning", 1987.

Primary Examiner—Richard J. Apley
Assistant Examiner—Joe H. Cheng
Attorney, Agent, or Firm—Merchant, Gould, Smith, Edell, Welter & Schmidt

[57] ABSTRACT

A computerized teaching system is described, which comprises an interactive group communication system, wherein students in a first group interact with a teacher in Social Mode, and, in some case, while students in a second group proceed with work in Independent Mode.

12 Claims, 6 Drawing Sheets

INTERACTIVE GROUP COMMUNICATION SYSTEM

BACKGROUND OF THE INVENTION

1. Field of the Invention

This invention relates in general to a computerized teaching system, and in particular to a computerized interactive group communication system.

2. Description of Related Art

The present invention is applicable to both the field of education and to group decision-making. It will therefore be generally understood that the terms "teacher" and "group leader" as used herein are interchangeable, and that the terms "student" and "participant" as used herein are also interchangeable.

Existing computer-based networks that are used in a classroom in a school, or for group decision making, are one of two types: Independent Mode and Social Mode.

Independent Mode refers to a design that allows students to interact with a program at their own pace. One example of an Independent Mode network is the PLATO TM system provided by Control Data Corporation.

Social Mode refers to a design that allows many students to respond simultaneously to a question posed by a teacher.

A prior system which can be used either in Social Mode or in Independent Mode is the Discourse System, which is described in U.S. Pat. No. 3,641,685, issued Feb. 15, 1972 to J. Zawels et al., which patent is incorporated by reference herein.

In the field of group decision-making, most systems are designed so that a group of participants may respond simultaneously to the same question, in a manner similar to the Social Mode design described above. Other networks for group decision-making are designed for individuals to respond to set questionnaires, each at his/her own pace, in manner similar to the Independent Mode described above.

In the field of education, however, there is a need to be able to divide a class into two or more groups of arbitrary size and for the teacher to interact with one group in Social Mode, while at the same time the members of the other group are simultaneously proceeding in Independent Mode. One possible example of this situation would be a teacher instructing members of a first group in mathematics, while members of a second group simultaneously perform, individually and at their own pace, drill-and-practice exercises.

Similarly, in group decision-making, there is a need for a first group to interact with a group leader conducting a brain-storming session, while members of a second group are simultaneously proceeding, individually and at their own pace, with personal judgments on a series of options.

Members of a group operating in Social Mode may wish to review present or past responses. It is desirable, therefore, that present or past responses be displayed to all the members on a central monitor. One way of doing this is to display the information on the teacher's terminal on a "public display", e.g., an LCD overlay for an overhead projector or large monitor which can be viewed by all participants in the Social Mode group. However, there is the serious disadvantage in the prior art that the teacher cannot display only selected portions of information from the teacher's terminal.

To overcome this difficulty, additional processing is needed for the data on the teacher's terminal, such as selection and magnification of characters. In this regard two requirements must be met. First, the process by which responses are displayed must not be so time-consuming as to significantly slow down the response time of the system and thereby disturb those students working in other groups. Second, the teacher must be able to monitor all of the responses, while selected responses are being displayed.

Further, there is a need to supply an ongoing indication to a student as to the correctness of their response, preferably while the student is responding and not just after the response is completed. There should be no significant delay in supplying this ongoing indication, notwithstanding the presence of several groups using the system or the use of the public display. Otherwise, the normally accepted typing speed on the students' terminals may not be possible.

There is also a need to allow a teacher to ask a spontaneous question in Social Mode, and while students are responding, to allow the teacher to specify a correct response and then evaluate the students' responses, with possible feedback from the teacher to the students. This is in contrast to the conventional use of computer-assisted instruction, wherein a lesson program is preprogrammed and stored before the students begin responding.

There is also a need for the students or the teacher to be able to control independent Audio-Visual (A-V) devices attached to each student terminal.

There is a further need to integrate handicapped students into the class through their participation in Social Mode lessons.

There is a further need for homebound students, who may be too ill to personally attend classes, to participate in Social Mode lessons, even though they are absent from the classroom. There is a further need for ill students to benefit from the information from any one of a variety of A-V presentations in the classroom.

Whatever the merits of prior computerized teaching systems, they do not achieve the benefits of the present invention.

SUMMARY OF THE INVENTION

To overcome the limitations in the prior art described above, and to overcome other limitations that will become apparent upon reading and understanding the present specification, the present invention discloses a computerized teaching system comprising an interactive group communication system, wherein students in a first group interact with a teacher in Social Mode, while, in some cases, students in a second group proceed with work in Independent Mode.

The present invention prevents response time from being significantly affected in those circumstances where the teacher is working with a first group in a Social Mode using a public display, while others may be working in Independent Mode.

The present invention also prevents information on the public display from being disturbed while the teacher monitors other information on the teacher's terminal.

The present invention also allows the display of responses on the teacher's terminal and a particular response on a public display, while the teacher interacts with a group in Social Mode.

The present also allows the teacher to pose spontaneous questions and then receive immediate responses, wherein students can begin entering the responses before the teacher enters the correct response, so that the teacher's evaluation of the students' responses proceeds without delay.

The present invention also allows handicapped students, e.g., those who cannot use a regular keyboard or who are visually impaired, to participate interactively in Independent Mode and Social Mode lessons.

The present invention also allows ill students who are not physically present in a classroom to participate interactively in Social Mode lessons.

The present invention also allows students who are not physically present in a classroom to simultaneously observe and hear the same information as students physically present in a classroom and to participate with a group working in Social Mode.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

The present invention discloses a computerized teaching system comprising an interactive group communication system, wherein students in a first group interact with a teacher in Social Mode, while students in a second group proceed with work in Independent Mode. The system allows a plurality of groups to each work on different subjects without interrupting other groups.

Figure 1:
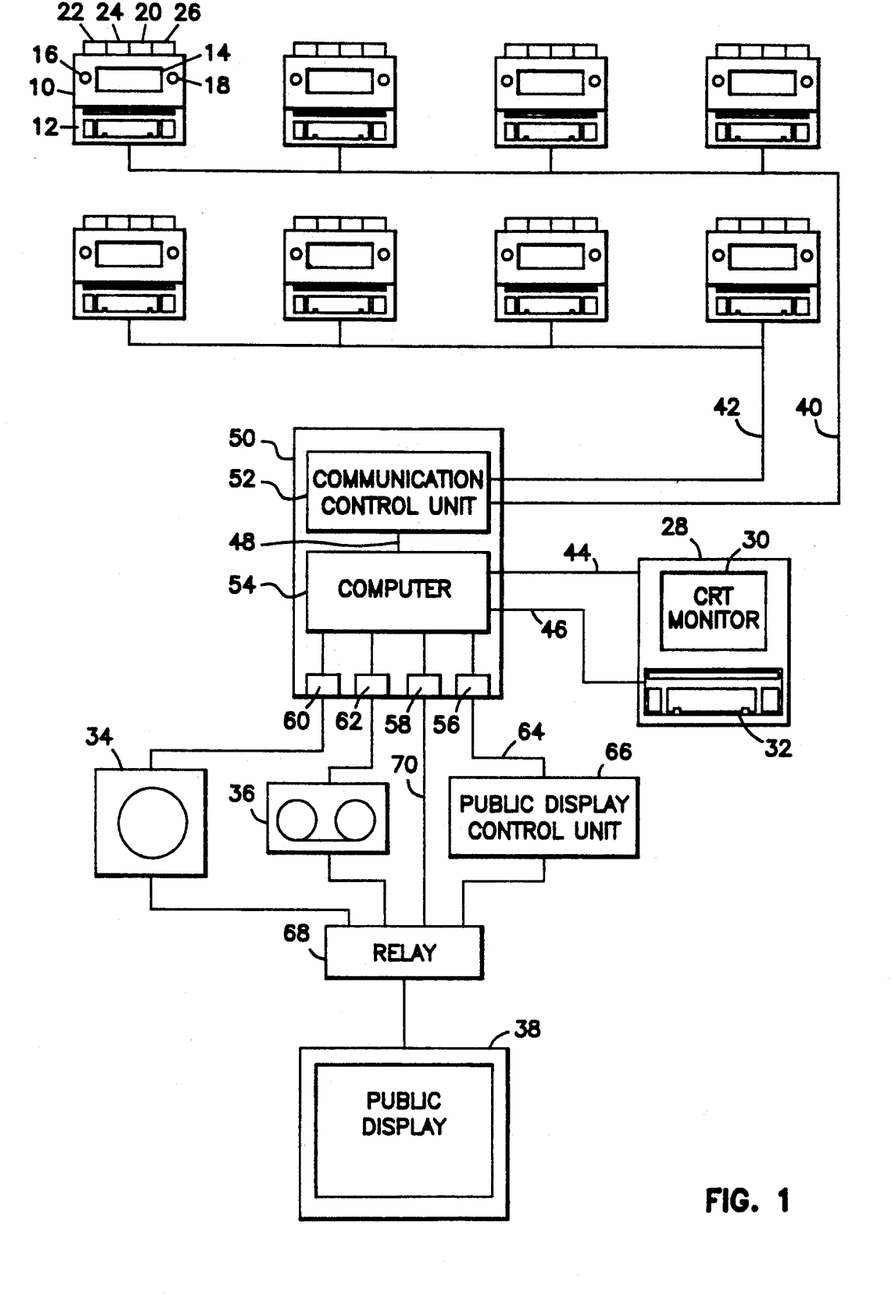
FIG. 1 is a schematic block diagram showing the interconnections of the various components of a system according to the invention.

Each student is provided with a terminal, which is referred to as a Studycom. Eight such Studycoms are shown in FIG. 1, indicated generally by reference numeral 10. The main features of a Studycom 10 include an alphanumeric keyboard 12, a multi-line LCD 14, visual reinforcement means 16 and 18, audio reinforcement means 20, terminal identification means 22, a local controller 24, and an audio-visual (A-V) output port 26.

The alpha-numeric keyboard 12 has number keys, letter keys, function keys, control keys, and cursor keys. The function keys permit students to sign-on to the system and to choose a particular group in which each wishes to participate, to edit their responses, to select a frame having information and questions, and to retrieve their previous responses.

The multi-line LCD 14, which includes driver circuitry, displays alphanumeric or graphic data. Such data can be created in real-time or can be stored in a series of preprogrammed information frames. The information frames may include questions created before the lesson or session. The LCD 14 also displays the characters that the student enters on the Keyboard 12.

The visual reinforcement means 16 and 18 may include Light Emitting Diodes (LEDs) in close proximity to LCD 14. The LEDs 16 and 18 flash in different modes depending on what the teacher has input on the terminal in real-time or has pre-programmed, and depending on what the student types on Keyboard 12.

The audio reinforcement means 20 may include a Speaker capable of "beeping" in various modes depending on what the teacher has input on their terminal in real-time or has pre-programmed, and depending on what the student types on Keyboard 12.

The terminal identification means 22 may be in the form of a four-pole Dip Switch. Thus, up to sixteen Studycoms 10 may be connected in parallel on a cable. The Dip Switch 22 settings make each Studycom 10 a unique address on the cable.

The A-V Output Port 26 connects the Studycom 10 to an optional Audio-Visual device (not shown). These A-V devices are distinct from the teacher-controlled, group A-V devices described hereinafter.

The teacher is provided with a terminal, which is referred to as a Controlcom 28. The Controlcom 28 may have a multi-line CRT monitor 30 which can display responses from several students at the same time. The Controlcom 28 may also include a Keyboard 32 having alphanumeric keys, function keys, control keys, and cursor keys. The Keyboard 32 may be used by the teacher to program a lesson, to select a group for interaction in Social Mode, to select a frame number for display, to actuate the Studycoms 10 of a group working in Social Mode, to control a Public Display 38, to display a particular response, and to control Audio-Visual (A-V) devices 34 and 36.

The Local Controller 24 connects the Studycom 10 to a Central Electronic Unit 50 via cables 40 and 42 and a Communication Control Unit 52. The Central Electronic Unit 50 includes a Computer 54, in the well known configuration of a Central Processing Unit (CPU), read-only memory (ROM), random access memory (RAM), external or disc memory, and optional input/output interfaces for a monitor, keyboard, and printer. The Computer 54 is connected to the Communication Control Unit 52 and a Public Display Communication Link 56 which controls the Public Display Control Unit 66 via cable 64. A string of characters entering Public Display Communication Link 56 appear on the Public Display 38. The Central Electronic Unit 50 also includes Interfaces 60 and 62 for a Video Disk Player 34 and a Video Cassette Player 36, respectively. It also includes a Relay Port 58 which controls a Relay 68 via cable 70. The Public Display 38 may be connected to the Public Display Control Unit 66, Video Disk Player 34, or the Video Cassette Player 36 by means of the Relay 68.

Communication between the Communication Control Unit 52 and the Local Controller 24 of each Studycom 10 is in the form of a train of pulses on cables 40 and 42. This pulse train may be divided into four parts. The first part of the pulse train is a System Reset pulse for resetting all Studycoms 10. The second part of the pulse train is a Sequential Studycom Number which is an encoded binary number ranging from 0 up to the maximum number of Studycoms 10 on a cable 40 or 42. In FIG. 1, four Studycoms 10 are shown on cable 40 and 42, hence, the binary codes range from 0 to 3 on each cable 40 and 42. When a Sequential Studycom Number is transmitted, the Studycom 10 whose Dip Switch 22 matches this number is activated. The third part of the pulse train is an encoded ASCII character, which is received for display on the LCD 14, or which is a control character for output on A-V Port 26. The fourth part of the pulse train is a set of pulses generated by Local Controller 24 by encoding the code for each key pressed on the Keyboard 12 into a serial pulse train. This set of pulses is sent back to the Communication Control Unit 52.

Figure 2:
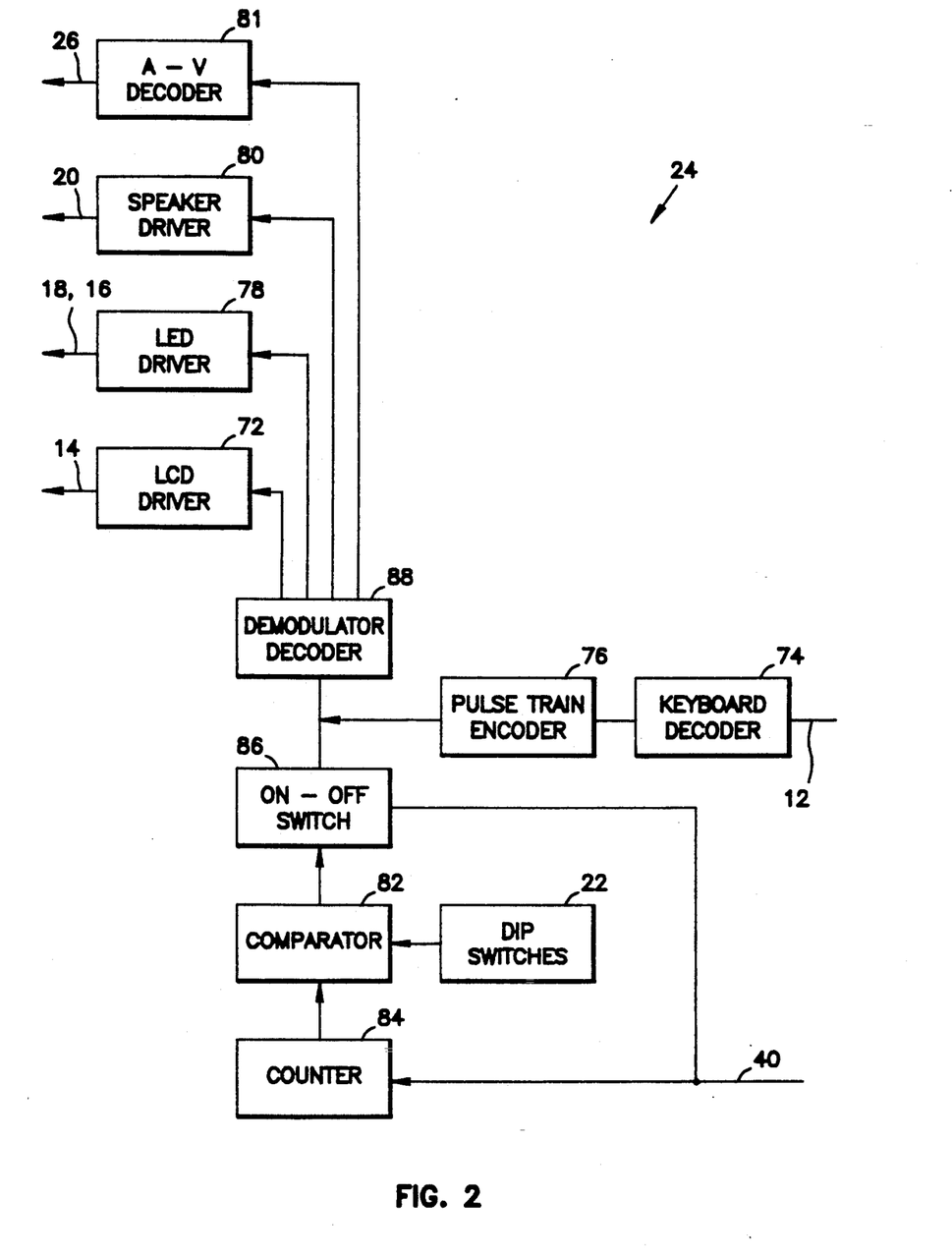
FIG. 2 is a schematic block diagram of a Local Controller.

FIG. 2 shows a schematic block diagram of the Local Controller 24 which is connected to the Communication Control Unit 52 via cables 40 or 42. Demodulator and Decoder 88 feeds the information received to LCD Driver 72 for the LCD 14, LED Drivers 78 for LEDs 16 and 18, Speaker Driver 80 for Speaker 20, and Audio-Visual Decoder 81 for A-V Output Port 26. Local Controller 24 also transmits the characters from the Keyboard 12 by means of Keyboard Decoder 74 and Pulse Train Encoder 76 which encodes the Keyboard 12 output onto the pulse train present on cable 40.

Dip Switches 22, connected to Comparator 82, determine the Sequential Studycom Number of a particular Studycom 10. Thus, when a pulse train is received on cable 40, including a Sequential Studycom Number, Counter 84 counts on successive rounds after a System Reset Pulse each time a Sequential Studycom Number is received. Should the Sequential Studycom Number be 3, and should the Dip Switch 22 of a particular Studycom 10 also be set to the binary number 3, Comparator 82 will detect the equality and activate the Studycom 10 via on-off Switch 86, while all the other Studycoms 10 on the line remain deactivated. Thus, each Studycom 10 is activated in a cyclical manner, e.g., every 20 milliseconds.

The Demodulator and Decoder 88 recognizes particular control characters and is thereby able to send the correct characters and signals to LCD Drive 72, LED Driver 78, Speaker Driver 80 and A-V Decoder 81.

Figure 3:
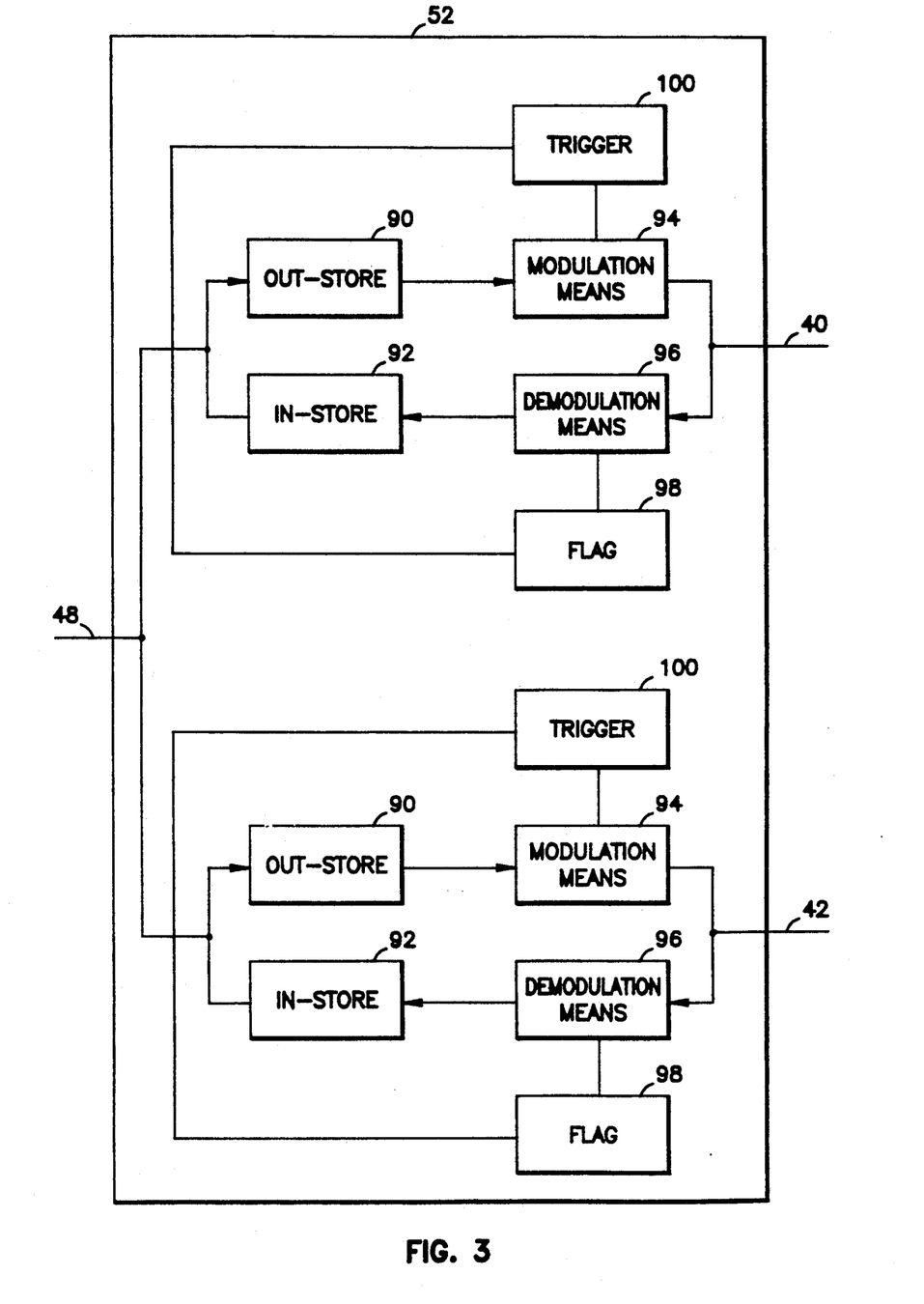
FIG. 3 is a schematic block diagram of a Communication Control Unit.

FIG. 3 shows a schematic block diagram of the Communication Control Unit 52. Two identical circuits are shown, one of which is connected to cable 40 and the other to cable 42. Additional such circuits and cables may be present. Each circuit includes Demodulating Means 96 for decoding an incoming character transmitted by a Studycom 10 from the pulse train and storing it in In-Store 92. Each circuit also includes Modulating Means 94 for generating and encoding a pulse train corresponding to the outgoing character to a Studycom 10, which is stored in Out-Store 90 together with a Sequential Studycom Number and a System Reset pulse if necessary. A Trigger 100 is provided for starting the pulse train and a Flag 98 is provided to indicate that the pulse train has been completed, by the Flag 98 being reset. In practice, the Trigger 100 and the Flag 98 are common for all the lines or cables, 40 and 42. The System Reset pulse is initiated externally and is a negative pulse. The outgoing character is pulse height modulated and the incoming character is pulse width modulated.

The Flag 98 is constantly interrogated by the Computer 54 via Line 48 during the operation of the Communication Control Unit 52. When the Flag 98 is reset, any character present in In-Store 92 is removed for processing and the following cycle of events is triggered by means of Trigger 100: Flag 98 is set; Modulating Means 94 encodes into a pulse train the character from Out-Store 90 plus a Sequential Studycom Number plus a System Reset pulse when the Sequential Studycom Number is 0; Demodulating Means 96 decodes the character received from the Local Controller 24 and stores it in the In-Store 92; and, Demodulating Means 96 resets Flag 98 at the end of the pulse train. Thus, from the instant that Trigger 100 is operated until Flag 98 is reset, the Communication Control Unit 52 works autonomously. Instead of the computer program constantly interrogating the Flag 98, the Communication Control Unit 52 can be triggered by the Computer 54 on receiving a hardware interrupt, as is known to those skilled in the art.

Figure 4:
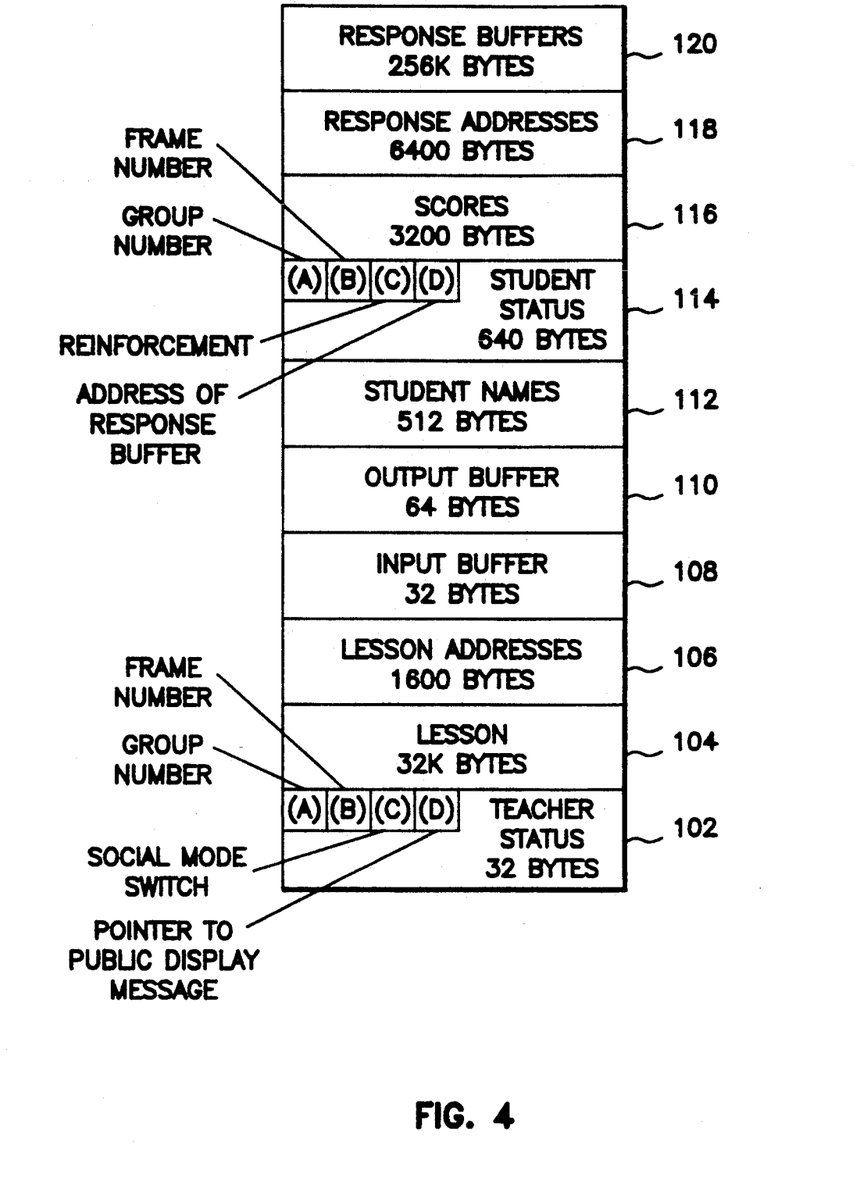
FIG. 4 is a memory map associated with a computer.

FIG. 4 shows a map of the RAM of Computer 54, which is partitioned into buffers.

Data associated with the teacher input is stored in Teacher Status buffer 102, which is 32 bytes. This includes the group number to which the teacher is currently addressed (cell (A)); the frame number within the lesson to which the teacher is currently addressed (cell (B)); a Social Mode Switch, comprising 1 byte per group, which is used to indicate which group is in Social Mode (cell (C)); and the address of a Public Message, which acts as a pointer (cell (D)).

Lesson buffer 104 contains as many lessons of variable lengths as there are groups. A Lesson may comprise 100 frames and the Lesson buffer 104 is typically 32 kilobytes in size.

Lesson Address buffer 106 is divided into as many substores as there are groups. Each sub-store is further divided into cells so that each cell contains the address of successive frames of the associated lesson. For example, eight groups with 100 frames per lesson would require 1600 bytes of storage.

Input Buffer 108 has as many bytes as there are students and stores the last character pressed by each student. Typically, Input Buffer 108 would be a minimum of 32 bytes in size.

Output Buffer 110 has as many 2-byte words as there are students. Each word contains the character to be displayed on the LCD 14, as well as the type of reinforcement to be given, and other control information such as are required for the operation of independent A-V devices via A-V Port 26. Typically, Output Buffer 110 would be a minimum of 64 bytes in size.

Student Name buffer 112 is divided into as many substores as there are Studycoms 10 in the system. Each substore contains the name of the student who signs in on his Studycom 10. Using 16 bytes per student, 512 bytes would be required (16×32=512).

Student Status buffer 114 is divided into as many substores as there are students. Each sub-store typically contains 20 bytes of primary data associated with each student. This includes the group number to which a student is currently addressed (cell (A)); the frame number within the lesson to which the student is currently addressed (cell (B)); the type of reinforcement that the student should be receiving, e.g., a short beep on the Speaker 20 and blinking of the LEDs 16 and 18 (cell (C)); and the address within the Student Response buffer 120 to which the student is currently addressed (cell (D)). Typically, the Student Response buffer 114 would require a minimum of 640 bytes (32×20=640).

Scores buffer 116 is divided into as many sub-stores as there are students. Each sub-store is divided into as many cells as there are frames in the lesson. Each cell contains information on whether the student was right or wrong on a particular frame, the number of tries, etc. Typically, the Scores buffer 116 would require a minimum of 3200 bytes (32×100=3200).

Response buffer 120 is divided into as many sub-stores as there are students. Each sub-store contains the responses of each student to each frame of the lesson on which the student is currently working. Typically, the Response buffer 120 would require a minimum of 256,000 bytes (32×8000=256,000).

Response Address buffer 118 is divided into as many sub-stores as there are students. Each sub-store is divided into as many cells as there are frames in the lesson associated with the group number in which the student is working. Each cell contains the address of the response of the student for the particular frame. Typically, the Response Address buffer 118 would require a minimum of 6,400 bytes (32×200=6,400).

Figure 5:
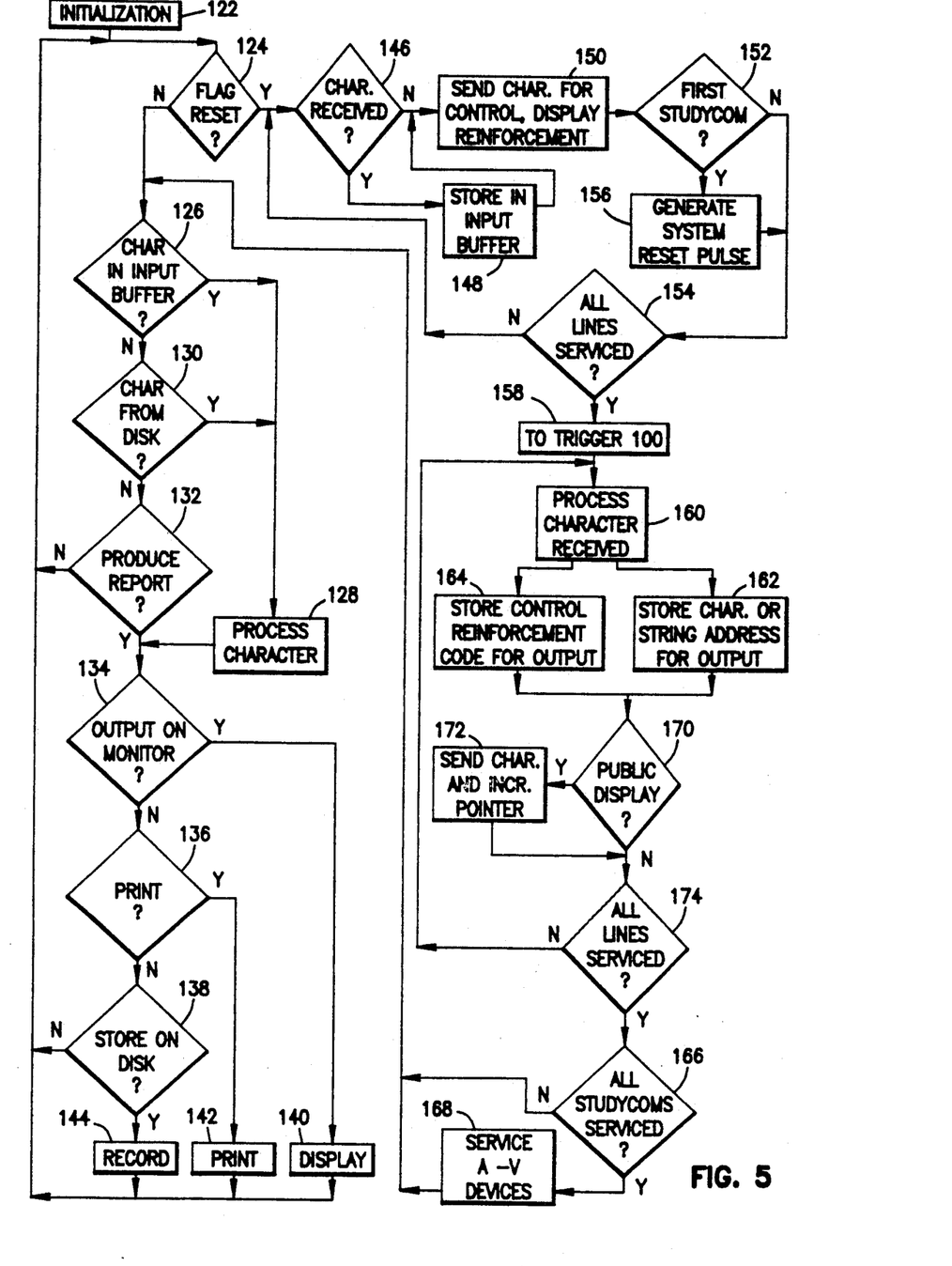
FIG. 5 is a flow chart showing the manner in which information is processed within the system.

FIG. 5 is a flow chart which indicates how information is processed within the system comprising the hardware and the program logic stored in RAM in Computer 54. In the flow chart, blocks 126 to 144 deal with servicing the Controlcom 28; block 124 and blocks 146 to 158 deal with the Communication Control Unit 52; blocks 160 to 166 deal with the Studycom 10; block 168 deals with the A-V devices 34 and 36; and blocks 170 and 172 deal with the Public Display hardware 38, 66 and 56.

Block 122 represents the initialization actions, e.g., initialization of printers (not shown), checking that the correct disks (not shown) are in place, and that the registers are properly initialized.

Block 124 determines whether Flag 98 is set, and services the Controlcom 28 repeatedly until the Flag 98 is reset. In servicing the Controlcom 28, block 126 determines whether a key has been pressed on the keyboard 32 of the Controlcom 28. If a key has been pressed, then the character is processed in block 128. If there is no input from the keyboard 32, block 130, representing the Disk Logic, determines whether a character has been received from the disk for processing in block 128. In block 128, the computer program logic stores the characters in one of the RAM buffers. Block 134 determines whether the character should be output on the CRT monitor 30 of the Controlcom 28. Bock 140 performs the output to the CRT monitor 30.

If block 130 determines that no characters have been received from the disk, then block 132 checks if there is a report being produced as a result of previous keystrokes on Keyboard 32. If a report is being produced, it will appear either on monitor 30 via blocks 134 and 140, or will be printed on a printer attached to Computer 54 via blocks 136 and 142, or will be recorded on disk via blocks 138 and 144.

If block 124 determines that Flag 98 has been reset, the Studycoms 10 are serviced in succession, starting off with the first Studycom 10 on cable 40 (Sequential Studycom Number 0). Thus, block 146 examines the contents of In-Store 92 of the Communication Control Unit 52, and if a character has been received, block 148 stores it in the Input Buffer 108 in RAM. Block 150 transfers the outgoing contents, if any, of the Output Buffer 110 to Out-Store 90 of the Communication Control Unit 52. The processing in blocks 146, 148 and 150 is repeated for other Studycoms 10 with the same Sequential Studycom Number on the other cables, i.e., cable 42.

Block 152 determines whether the first Studycom 10 on the first line (corresponding to cable 40) is being serviced, and if so, block 156 initiates a System Reset pulse. Block 154 ensures that all cables 40 and 42 are serviced.

When all Studycoms 10 with the same Sequential Studycom Number on all the cables 40 and 42 have been serviced, block 158 shows that Trigger 100 is to be operated. Block 160 represents the processing of characters stored in Input Buffer 108 for the Nth Studycom 10 (Sequential Studycom Number N) on cable 40. The result of this processing may cause a character (out of a string of characters) to be displayed on the LCD 14, so block 162 provisionally stores it in Output Buffer 110. In addition, block 164 indicates any reinforcement information in association with the character are also stored in Output Buffer 110. Blocks 162 and 164 can also be used for ASCII and control characters to be stored to be ultimately used in independent A-V devices. This process is repeated for all terminals. Block 174 ensures that all cables 40 and 42 are serviced.

The group A-V devices 34 and 36 may be serviced at different points in the cycle, depending on the time requirements of servicing of these devices 34 and 36. Block 166 ensures that the A-V devices are serviced in block 168 only after all Studycoms 10 on all lines have been serviced.

Whereas the group A-V devices can be serviced by very few control characters, the display of spontaneously created messages on the Public Display Block 38, via the Public Display Communication Link 56 and the Public Display Control Unit 66, requires the transmission of long strings of characters. To prevent tying up the system with transmitting a long string of characters, very few (typically one) characters at a time are transmitted per cycle, while a pointer keeps track. Thus, after each Studycom 10 is serviced, block 170 determines whether a Public Display 38 message is present and if so, block 172 transmits a character and increments the pointer to the string accordingly.

After servicing all Studycoms 10 on all the lines, as well as the Public Display 38 and group A-V devices, processing from block 166 continues at block 126.

The Studycoms 10 are processed in the following order. In a given round, block 146 interrogates the Studycoms 10 with Sequential Studycom Numbers N on all lines in succession to determine if there are incoming characters. Then, the outgoing characters in block 150 are associated with Sequential Studycom Numbers N+1, which were processed in a previous round. Finally, block 160 processes the Studycoms 10 with Sequential Studycom Numbers N+2 and stores them for output on a future round. The number N is increased with every round until the maximum number of Studycoms 10 is reached and exceeded, at which point N is set back to 0, and the cycle is repeated.

In operation, the teacher enters a group number which is stored in Teacher Status buffer 102 of the RAM. The teacher then enters a frame number and constructs a frame, which includes the answer to a question, the question that appears on the Public Display 38, the text that is displayed on the Studycoms 10, the reinforcement that is associated with that question, the score for that question, and the Audio-Visual devices that must be activated. For example, the following string represents a frame: "G3<cr>@E<cr>15—3-

\TEXAS; Which State covers the biggest area?;TT Write your single word answer here;V1004V." This frame indicates that: it is in Group 3; reinforcement must be given to the student on entry of each correct character, i.e., E for Every Letter; the frame number is 15; the maximum score is 3; the correct answer is TEXAS; the Public display 38 displays the message "Which State covers the biggest area?"; the Studycoms 10 display the message "Write your single word answer here"; and the Video Disk displays frame 1004. This frame is stored in the Lesson buffer 104 with its address stored in Lesson Address buffer 106. Block 128 processes the teacher's keystrokes.

Alternatively, with the help of Disk Logic block 130, several lessons, each of which comprise many frames, are loaded from disk into buffers 104 and 106. Furthermore, each student enters a group number, e.g., say 3, which is stored in the Student Status buffer 114, and then enters his name which is stored in Student Name buffer 112.

In Independent Mode, a student may address his Studycom 10 to a particular frame of a lesson which is associated with his group by pressing function key F1 followed by the frame number. This gets stored in Student Status buffer 114, which with the Lesson Address buffer 106 causes the Studycom 10 to be addressed to the particular frame. The student then proceeds to respond. Alternatively, the stored lesson indicates the next frame depending on the answer to the previous frame. Block 160 processes the student's keystrokes.

The student's response is stored in the Response buffer 120 and the address of the response in the Response Address buffer 118. Block 160 compares the student's response at every keystroke with the answer of the frame in the Lesson buffer 104. Depending on the reinforcement prescribed for each character of the response as indicated for that frame in Lesson buffer 104, the reinforcement to be given is stored in the Student Status buffer 114. In the above example, the reinforcement is provided on every letter and on whether the character entered by the student matches the corresponding character of the answer of that frame in Lesson buffer 104. Block 150 displays the particular character with the reinforcement. Furthermore, depending on the score associated with that frame, a score is inserted in Score Buffer 116. For example, if the student correctly responds with "TEXAS", then the student is awarded 3 points for that frame.

In contrast, students operating in Social Mode are barred from addressing themselves to a particular frame by blocking function key F1. Only the teacher is able to address the Studycoms 10 to a particular frame in Social Mode.

To place a particular group in Social Mode, the teacher addresses him/herself to that group (cell (A)), and sets the corresponding Social Mode Switch (cell (C)) in the Teacher Status buffer 102. Block 160 inspects the Social Mode Switch and blocks any attempt by a student within the Social Mode group to address to a particular frame by blocking function key F1.

The teacher addresses to a particular frame in the lesson associated with the group. For example, when a frame number is entered by the teacher, it is recorded in the Teacher Status buffer 102 (cell (B)) and in the relevant frame number location of the Student Status buffer 114 (cell (B)) for each student in the group. Thus, all students in the group can only work in concordance with the teacher in Social Mode, while other students may work in Independent Mode.

In addition, the teacher may ask a spontaneous question of the group instead of addressing a preprogrammed frame. This is accomplished by the teacher typing a frame number and pressing a key, which prepares the system for receiving responses. The frame number refers to an 'empty frame', since no relevant information is present in Lesson Buffer 104. The frame number is stored in cell (B) of Teacher Status buffer 102 and in cell (B) of Student Status buffers 114 for each student. After the students start responding to the spontaneous question, the teacher may choose to construct the frame, and in particular, the correct response. Thus, students can respond even if the lesson has not been preprogrammed and stored, which is contrasted with the conventional use of computer-assisted instruction.

A student's response in Response Buffer 120 is compared via Block 160 with the correct response, if present, in Lesson Buffer 104. Block 160 evaluates the students' responses, which may produce feedback information on the Controlcom monitor 30 and, if programmed, visual reinforcement via LED's 16 and 18 and audio reinforcement via Speaker 20.

Since the addresses of the responses of any student to any frame are available from the Response Address buffer 118, the student names are available from the Student Name buffer 112, and the current group number and frame number of students and the teacher are available from cells (A) and (B) of the Student Status buffer 114 and Teacher Status buffer 102, respectively, block 132 produces a response report on the monitor 30 of the Controlcom 28, listing the student name and the associated current response of each student within a group. By numbering these responses, or noting their location on the screen 30, or typing the response number on the keyboard 32, or using a 'mouse' to point to the response, the address of any response can be stored in cell (D) of Teacher Status buffer 102.

Blocks 170 and 172 cause the string of characters of the response to be transmitted via Public Display Communication Link 56 and the Public Display Control Unit 66 to Public Display 38 with minimum time interference to the rest of the system. Alternatively, if a table is produced which associates a student's seat number with a student's name, a particular student's current response can be displayed on the Public Display 38 by typing the seat number or pointing to the seat number on the monitor 30 with a mouse. In all instances, the information on the teacher's monitor 30 is not necessarily affected by what appears on the Public Display 38.

Should it be desired that each Studycom 10 have its own independent A-V device connected to A-V Output Port 26, then A-V Decoder 81 in FIG. 2, on receiving a string such as "<17>C100,250C<17>" causes a Video Cassette Player connected to A-V Output Port 26 to start up and play the section of video tape between numbers 100 and 250. The control code "<17>" ensures that the Demodulator and Decoder 88 in transmits the string to A-V Decoder 81 only, while ignoring LCD Driver 72, LED Driver 78, and Speaker Driver 80. This string is embodied in the program in a frame, e.g., the string "@E<cr>15-3\TEXAS;TT Which State covers the biggest area?;<17>C100,250C<17>." This string indicates that: reinforcement must be given to the student on entry of each correct character; the frame number is 15; the maximum score is 3; the correct answer is TEXAS; the Studycom 10 displays the message "Which State covers the biggest area?"; and the Video Cassette Player plays as indicated above when frame 15 is selected by a student working in Independent Mode. In Social Mode, the Video Cassette Players of all students in the relevant group who have this device play simultaneously, while the teacher's Video Cassette Player 36 also plays for the benefit of those who do not possess a Player 36 connected to A-V Decoder 81. As will be described, this is important when incorporating students who are not physically present into a Social Mode group.

In order to accommodate students with various physical disabilities or handicaps, the Studycom 10 can be modified or replaced to help overcome a particular disability. For example, for the visually handicapped the LCD 14 can be replaced by a CRT monitor which displays characters whose size can be varied. Also, the LEDs 16 and 18 may be replaced by signals appearing on the CRT monitor. In cases where the physical handicap of the student is such that the student finds great difficulty in actuating the keys of a regular keyboard, the Keyboard 12 may be replaced by a keyboard with very large keys or by a device which is actuated by a pointer, e.g., a light beam controlled by the person's head, as is well known to those working in the field of keyboards for the physically handicapped. Such handicapped students are normally precluded from participating in a regular classroom lesson which demands written responses because of the slowness with which they respond. According to the present invention, regular students sign into a particular group, while physically handicapped students sign up into another group. Both groups are placed into Social Mode and thereafter would be treated by the teacher as if they are in one group. A frame is then programmed as follows: "G1,2<cr>@E<cr>15-3\TEXAS — 1-\B — 2\TT Which State covers the biggest area?;TH;-Which State covers the biggest area? A=California B=Texas C=New York." This frame indicates that: Groups 1 and 2 are in Social Mode; reinforcement is given on every correct letter; the frame number is 15; the maximum score is 3; the students in Group 1 must respond with Texas in order to be correct; while the students in Group 2 must type B in order to be correct; the message "Which state covers the biggest area?" is displayed on the LCDs 14 in Group 1; the multiple choice question "Which State covers the biggest area? A=California B=Texas C=New York" is displayed on the LCDs 14 in Group 2.

For students who are unable to be physically present in the same classroom as the teacher, communication is established via a telephone link. Of particular importance is that the teacher should not be encumbered with too many additional actions by virtue of having to teach students who are remotely located. Even more important is that the students who are remotely located should not be encumbered with actions which are different from those of the students who are in the classroom with the teacher.

Figure 6:
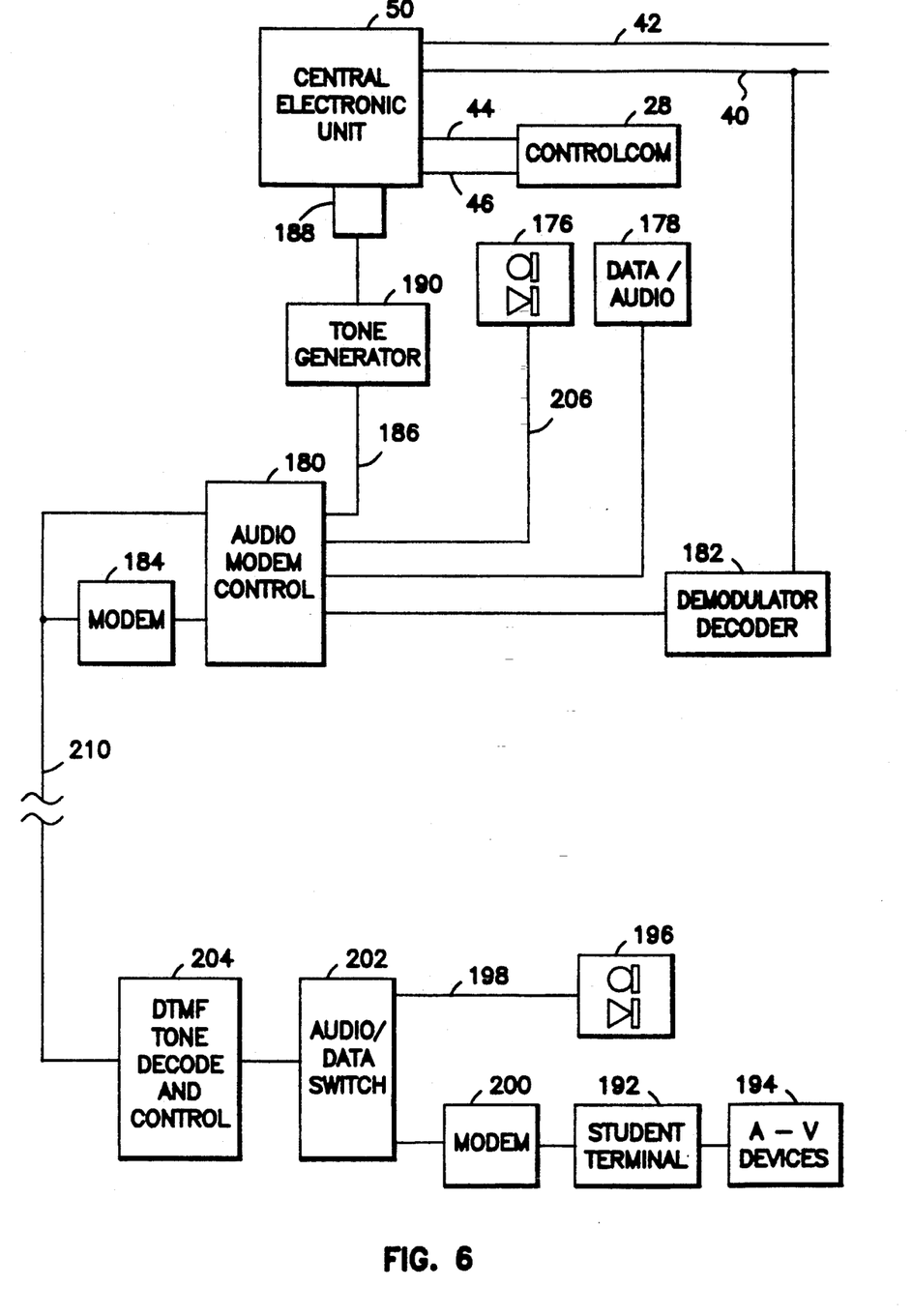
FIG. 6 is a schematic block diagram of the interconnection of a remote student terminal with the Central Electronic Unit.

FIG. 6 is a schematic block diagram of the interconnection of a remote Studycom 10 with the system. In certain respects, FIG. 6 assumes that simultaneous voice and data communications are not possible by the presence of two separate channels and hence switching from the one to the other is necessary.

Central Electronic Block 50 is connected to the Controlcom 28 via links 44 and 46. Lines 40 and 42 are the cables which connect to Studycoms 10. There is now added within reach of the teacher: a Microphone and Speaker 176 with line 206 of a telephone link for voice communication; an Audio/Modem Control 180, which can be switched to voice mode for speaking on the telephone line 206 or to data mode for data transmission from Demodulator Decoder 182 via modem 184; the Audio./Modem Control 180 switching from data to voice can be done by the teacher using a Data To Audio Control Switch 178 or by a suitable control code embedded in the data; the Audio/Modem Control 180 switching from voice to data can be done by the Computer 54 within the Central Electronic Block 50 using a connection via Port 188, Tone Generator 190, and line 186.

The Demodulator Decoder 182 is connected to a separate line or to an existing line like 40 or 42, and includes the elements of a Local Controller 24, except that instead of generating electrical signals suitable for driving LCD Driver 72, LED Driver 78, Speaker Driver 80, and A-V Decoder 81, binary coded pulses like those used in normal data transmission in telephone modems are transmitted, as is known to those skilled in the art. A computer with a suitable program, connected via a modem to the telephone line in the remote location, decodes the pulses into actions such as writing on the screen of the remote terminal, sounding a beeper, blinking a reinforcement light, or operating an A-V device. Also, the ASCII code received by Demodulator Decoder 182 from the remote terminal keyboard enters the Pulse Train Encoder 76 of FIG. 2 directly without the need of the Keyboard Decoder 74.

The Remote Student Terminal (RT) 192, includes a computer which has connected to it any desired Audio-Visual devices 194. Within reach of the RT student is a Microphone and Speaker 196 for voice communication connected to telephone line 198. The RT 192 is connected via a Modem 200 to an Audio/Data Switch 202, which allows for either voice communication via the Microphone and Speaker 196 or for data communication via Modem 200. DTMF Tone Decode Control 204 controls the Audio/Data Switch 202 using a tone which it receives from Tone Generator 190 and the signals from the Data to Audio Control Switch 178. The actual telephone connection is represented by line 210.

In operation, when an RT 192 is used, the teacher establishes voice communication via the Microphone and Speaker 176, while the student uses the Microphone and Speaker 196. Teaching proceeds in a normal manner by presenting information and asking questions to which the students can respond verbally. When the teacher operates the Keyboard 32 in order to display a message on the Public Display 38, a Tone signal from Tone Generator 190 operated by the Computer 54 switches both the Audio/Modem Control 180 and the Audio/Data Switch 202 by means of DTMF Tone Decode And Control 204 (which detects the tone and changes from voice mode to data mode communication) into the same mode. The Public Display 38 message is also transmitted to the screen of the RT 192 so that the remote student has the same visual information as the class. When the transmission of the message is completed, Audio/Modem Control 180 and Audio/Data Switch 202 revert back to voice modes by virtue of control characters at the end of the message or the loss of the carrier of the Modem 184 by virtue of the teacher having operated the Data to Audio Control Switch 178.

A completely analogous situation applies in the case where the teacher operates A-V Devices 34 and 36 so that, for example, when the Social Mode group is shown a segment of Video Disk 34 information between frame numbers 1000 to 2000, the same is seen and heard at the RT 192 from their Video Disks 194. In other words, the control codes of the A-V Demodulator Decoder 182 originate from the Lesson buffer 104 of Computer 54.

When a question is asked by the teacher and the teacher presses the "PLEASE ANSWER" key, a tone is generated by Tone Generator 190, which again places Audio/Modem Control 180 and Audio/Data Switch 202 in Data Mode, so that the teacher observes the answers of all students in the Social Mode group, including the RT 192 student. The RT 192 student can sign on to a Social Mode group in a similar manner in that when the teacher presses a "STUDENTS SIGN ON" key the Tone Generator 188 places the system in Data Mode and RT 192 students can sign on with the rest of the students in the same group. The teacher can return the system to voice mode communication by means of the Data To Audio Control Switch 178. This is on of the few instances that additional actions are taken by the teacher while teaching, solely for the sake of RT 192 students. The RT 192 students are freed from the task of taking actions for switching from Voice to Data or vice versa and hence need not learn new tasks or take special action by virtue of their remote location. Of course, any switch operated by the teacher can be either manually or by voice control operation.

For Independent Mode operation, the teacher must take special actions to establish voice or data communication by means of Data To Audio Control Switch 178 and Tone Generator 190. In the case where the RT 192 student works in Independent Mode with a lesson which is stored in the RT 192 rather than the teacher's Computer 54, the group number of the student, the frame number that the RT 192 student selects, the student's response, and the current score are transmitted back to the teacher's Computer 54, where it is then displayed on the teacher's monitor 30.

In summary, a computerized teaching system has been described which comprises an interactive group communication system, wherein students in a first group interact with a teacher in Social Mode, while students in a second group may simultaneously proceed with work in Independent Mode.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An electronic teaching system, comprising:
   (a) at least one group leader terminal;
   (b) a plurality of participant terminals connected to the group leader terminal;
   (c) subject matter storage means for storing a plurality of subjects, wherein each subject includes at least one frame;
   (d) communication control means for receiving multi-character responses from the participant terminals;
   (e) data processing logic means for simultaneously displaying the participant terminal responses on the group leader terminal as the responses are received by the communication control means;
   (f) group designation means for dividing the participant terminals into a plurality of groups, wherein the participant terminals within a group are isolated from the participant terminals in other groups;
   (g) Social Mode means, operative within a first group, for coordinating the participant terminals within the first group to collectively address a frame from the subject matter storage means, wherein the Social Mode means comprises means for addressing an empty frame and means for comparing a response entered on a participant terminal with a desired response after a response action is completed; and
   (h) Independent Mode means, operative within a second group, for allowing the participant terminals within the second groups to independently address a frame from the subject matter storage means.

2. The system of claim 1, further comprising means for comparing at every keystroke a response entered on a participant terminal with an answer in a frame stored in the subject matter storage means and means for supplying an ongoing correctness indication for the response entered on the participant terminal while the response is being entered, wherein the correctness indication is simultaneously displayed on the group leader terminal.

3. The system of claim 1, wherein the Social Mode means further comprises audio-visual means, under the control of the group leader terminal, for displaying audio-visual material pertaining to the frame to the first group.

4. The system of claim 1, wherein the Social Mode means further comprises means for simultaneously displaying selected responses of the first group on a public display.

5. The system of claim 4, wherein the Independent Mode means further comprises means for preventing response times from being significantly affected when the first group is using a public display.

6. The system of claim 1 wherein the Social Mode means further comprises means for storing student responses in student response storage means, wherein one of the responses from the student response storage means is selected and stored in the subject matter storage means.

7. An electronic teaching system, comprising:
   (a) at least one group leader terminal;
   (b) a plurality of participant terminals connected to the group leader terminal;
   (c) subject matter storage means for storing a subject, wherein the subject comprises a plurality of frames;
   (d) communication control means for receiving multi-character responses from the participant terminals;
   (e) data processing logic means for simultaneously displaying the participant terminal responses on the group leader terminal as the responses are received by the communication control means;
   (f) Social Mode means for coordinating the participant terminals to collectively address a frame from the subject matter storage means, wherein the Social Mode means comprises means for addressing an empty frame and means for comparing a response entered on a participant terminal with a desired response after a response action is completed; and (g) means for simultaneously displaying a part of the frame on all the participant terminals by selecting the frame at the group leader terminal.

8. The system of claim 7, wherein the Social Mode means further comprises means for displaying a plurality of responses on the group leader terminal and means for independently displaying only a particular response on a public display.

9. The system of claim 7, wherein the participant terminals further comprise means for adapting the participant terminals for use by handicapped students, wherein the frame are programmed with at least two correct answers so that a handicapped participant can response with a single character response that is compared against a first correct answer based on a multiple choice question requiring a single character response, while simultaneously a non-handicapped participant can respond with a multi-character response that is compared against a second correct answer.

10. The system of claim 9, wherein the participant terminals further comprise means for displaying variable size characters.

11. An electronic teaching system, comprising:
(a) at least one group leader terminal;
(b) a plurality of participant terminals connected to the group leader terminal, the plurality of participant terminals comprises at least one participant terminal located remotely from the group leader terminal;
(c) communication control means for transmitting data between the group leader terminal and the at least one remotely located participant terminal, wherein the communication means receives multi-character responses from the participant terminals;
(d) subject matter storage means for storing a subject, wherein the subject comprises a plurality of frames;
(e) data processing logic means for simultaneously displaying the participant terminal responses on the group leader terminal as the responses are received by the communication control means;
(f) Social Mode means for coordinating the participant terminals to collectively address a frame from the subject matter storage means, wherein the Social Mode means comprises means for addressing an empty frame and means for comparing a response entered on a participant terminal with a desired response after a response action is completed;

(g) audio-visual means, attached to the at least one remotely located participant terminal, for displaying the frames from the subject matter storage, wherein the frames contain audio-visual control codes to activate the audio-visual means; and (h) public display means, attached to the group leader terminal, for displaying messages, wherein messages displayed on the public display means are transmitted to the at least one remotely located participant terminals.

12. An electronic teaching system, comprising:
(a) at least one group leader terminal;
(b) a plurality of participant terminals connected to the group leader terminal, the plurality of participant terminals including at least one participant terminal located remotely from the group leader terminal;
(c) subject matter storage means for storing at least one subject, wherein each subject includes at least one frame;
(d) two-way data and voice mode communication means, adapted to be controlled from the group leader terminal, for transmitting data and voice conversation between the group leader terminal and the at least one remotely located participant terminal;
(e) means for simultaneously addressing all the participant terminals, including the at least one remotely located participant terminal, to a desired frame in the subject matter storage means by selecting the desired frame at the group leader terminal;
(f) communication control means for receiving multi-character responses from the participant terminals, wherein the communication means comprises tone generation means, actuated from the group leader terminal, for switching from voice to data communication and from data to voice communication at the at least one remotely located participant terminal; and
(e) data processing logic means for simultaneously displaying the participant terminal responses on the group leader terminal as the responses are received by the communication control means.

* * * * *

UNITED STATES PATENT AND TRADEMARK OFFICE
CERTIFICATE OF CORRECTION

PATENT NO. : 5,263,869
DATED : November 23, 1993
INVENTOR(S) : Jakob Ziv-El It is certified that error appears in the above-identified patent and that said Letters Patent is hereby corrected as shown below:

```
    Column 1, line 5, after "INVENTION" strike "1. Field of";
line 6, insert --1. Field of-- before "the Invention".
Column 12, line 7, after "Audio" and before "/Modem" strike
the period ("."). Column 15, line 15, "frame" should read
--frames--. Column 16, line 44, "(e)" should read
--(g)--.
```

Signed and Sealed this

Twenty-third Day of August, 1994

Attest:

BRUCE LEHMAN

Attesting Officer

Commissioner of Patents and Trademarks